United States Patent Office 3,051,672
Patented Aug. 28, 1962

3,051,672
POLYVINYL HALIDES PLASTICIZED WITH EPOXIDIZED ESTERS OF HIGHER FATTY ACIDS CONTAINING PAIRS OF ACYLOXY GROUPS
Stanley P. Rowland, Cincinnati, Ohio, and Ralph G. White, Minneapolis, Minn., assignors to Rohm & Haas Company, Philadelphia, Pa., a corporation of Delaware
No Drawing. Filed July 18, 1958, Ser. No. 749,336
4 Claims. (Cl. 260—23)

This application is a continuation-in-part of our application Serial No. 507,142 filed May 9, 1955, which is a division of our application Serial No. 453,120 filed August 30, 1954, now abandoned. A continuation-in-part of the last-mentioned application covering divisible subject matter was filed April 17, 1958, Serial No. 729,076, now abandoned.

This invention relates to modified epoxidized esters. It relates to modified epoxidized esters which serve as improved plasticizers and stabilizers for such plastics as vinyl resins, nitrocellulose and chlorinated rubber. It also relates to the preparation and use of such epoxidized esters.

Currently large quantities of plastic articles are made from plasticized compositions containing polyvinyl chloride, copolymers of vinyl chloride and vinyl esters such as vinyl acetate, polyvinylidene chloride, polyvinyl butyral, copolymers of vinyl chloride and vinylidene chloride, nitrocellulose and chlorinated rubber. It is common practice to use epoxidized esters in the preparation of such plastic materials because the esters not only serve as plasticizers or softeners for the plastic materials but also exert a stabilizing effect on the latter and prevent them from degrading under the influence of light and heat. This is evident from sales bulletins and the patent literature such as, for example, U.S. Patents 2,556,145 and 2,559,177. The epoxidized esters in turn are made by treating olefinically unsaturated esters with peracids, typified by performic and peracetic acids, as shown in U.S. Patents 2,458,484, 2,485,160 and 2,569,502.

While commercial epoxidized esters are generally good as plasticizers, they do, nevertheless, tend to migrate to the surface of the plasticized compositions and impart a sticky surface to which dust and dirty may adhere. Moreover, esters which are merely epoxidized are leached from plastic compositions by means of soapy water, as in the case of plastic shower curtains, or are absorbed from the surfaces of plastic articles by paper, cardboard, fabrics or clothing with which they come in contact.

It is, therefore, an object of this invention to provide modified epoxidized esters which have little, if any, tendency to behave in these ways so that more stable plastic compositions can be made for use in such articles as curtains, draperies, upholstery, luggage, handbags and the like.

It is a fact that even under the best conditions of epoxidation, some by-products, chiefly hydroxy-acyloxy derivatives, are formed together with the epoxy derivatives. Thus, when performic acid is employed the by-products are dihydroxy or hydroxy-formoxy derivatives, while when peracetic acid is used the by-products are largely hydroxy-acetoxy compounds. We have found that products having much improved plasticizing properties are obtained when the by-product hydroxyl groups and formoxy groups, if any, in the epoxidized esters are converted to acetoxy, propionoxy or butyroxy groups. Such modified products which contain vicinal acetoxy, propionoxy and butyroxy substituents in addition to epoxy groups have much better permanence in plastic compositions in general and in vinyl resins in particular. Such modified epoxidized esters are much more stable in plastic compositions; and they migrate or spew far less than the corresponding unmodified esters. Furthermore, due to their epoxy groups, they retain the ability to prevent degradation of the plastic materials under the effect of light and heat.

In the process of this invention, epoxidized esters, which are the products obtained by the epoxidation of olefinically unsaturated esters and which contain by-product hydroxyl substituents as well as epoxy substituents, are acylated with an acylating agent to introduce the acyl radical of an organic acid containing two to four carbon atoms. That is to say, the esters are treated with a compound which reacts with hydroxyl groups in said esters and converts them to acyloxy groups. Acylating agents include the anhydrides of acetic, propionic and butyric acids and also ketenes (ketene, methyl ketene and ethyl ketene) as well as mixtures of one of these anhydrides or one of these ketenes with one of the acids (acetic, propionic, and butyric). By this process the hydroxyl groups in the epoxidized ester are converted to acetoxy, propionoxy or butyroxy groups. Because of their cost, availability and ease of reaction, acetylating agents are much preferred for use in this conversion.

There are two preferred methods by which the acylation reaction can be carried out.

One method, referred to herein as "mild acylation" employs conditions such that, for the most part, only the by-product hydroxyl groups are affected and are converted to acyloxy groups while the epoxy groups remain intact. Consequently, the products are much more compatible with and stable in plastics—particularly vinyl resins—and at the same time they impart essentially the same heat- and light-resistance to the plastic compositions in which they are employed. This method is applicable to all epoxidized esters and results in enhanced compatibility with, and permanence in, plastic compositions.

Another method is referred to herein as "degradative acylation" because the conditions employed are such that some of the epoxy groups in the esters are purposely opened and are converted into vicinal acyloxy groups. This procedure is especially recommended for improving the properties of the epoxidized vegetable oils, such as epoxidized soybean oil.

In the first of these methods, the acylating agents are acetic anhydride, propionic anhydride, butyric anhydride, ketene, methyl ketene, and ethyl ketene. It is recommended that an excess—of the order of 300% to 1000%—of the acylating agent over that amount equivalent to the hydroxyl groups in the epoxidized ester be employed. (The number of hydroxyl groups present in an epoxidized ester is readily calculated from a knowledge of the iodine number of the original ester and of the content of oxirane oxygen, the iodine number and saponification number of the epoxidized ester. These values can be easily determined by conventional means.) The excess not only tends to favor complete acylation but it also dilutes the acid which is formed in the reaction of anhydride and the by-product hydroxyl groups and thereby reduces the chances of the acid's taking part in the reaction. This is important because a free acid—in contrast with an anhydride or a ketene—tends to cause a cleavage or an opening of the oxirane ring with the subsequent loss of epoxy groups. In fact, in the preferred embodiment of this mild acylation process, the free acid is continuously removed by distillation. Thus, by the use of an excess of anhydride and/or in the substantially complete absence of free acid, maximum esterification of hydroxyl groups takes place together with minimum cleavage of epoxy groups. When the ketenes are used, the problem of the presence of free acid does not arise.

The epoxidized ester and acetylating agent are merely mixed and agitated. Temperatures from 0° to 200° C.

have been used; and, as in most cases, the rate of reaction increases with temperature. Temperatures from about 100° C. to about 150° C. are recommended. In a large commercial batch, it has been found that about one hour at 150° C. or about 4 hours at 100° C. is adequate in all cases. Substantially anhydrous conditions are maintained throughout. The acylated ester is freed of the acylating agent and any other volatile contaminants by distillation under reduced pressure. The acylating agent is thus recovered for further use.

The object of this kind of acylation is to retain the epoxy groups while at the same time converting the by-product groups to acyloxy groups. The products of the mild acylation process which are the most desirable are those which have at least 80% of the theoretically maximum amount of oxirane oxygen. That is to say, the best products of this type have an average of at least four epoxy groups for every pair of vicinal acyloxy groups.

In the degradative procedure, the starting materials again are mixtures of esters which are the products obtained by the epoxidation of olefinically unsaturated esters and which contain hydroxyl groups and epoxy groups which groups may be in different ester molecules when a monoethylenically unsaturated ester is the starting material for the epoxidation or they may be in the same or different ester molecules when a polyethylenically unsaturated ester is the starting material for the epoxidation. This procedure is particularly beneficial in modifying and improving the plasticizing properties of epoxidized glyceride esters—especially the epoxidized vegtable oils. Here acetic anhydride, propionic anhydride or butyric anhydride is used in conjunction with the corresponding acid because it is desired to convert some of the epoxy groups to vicinal acyloxy groups and the acid is more effective than the anhydride in cleaving the oxirane ring. Free acid can be added to the reaction mixture or advantage can be taken of the acid which results from the reaction of the anhydrides and the hydroxyl groups in the ester. The use of a neutral or slightly basic salt, such as sodium acetate, as a catalyst is also recommended. The temperature should be from about 100° to 200° C. and temperatures of the order of 130°–170° C. are recommended. In large batches, a period of about two to twelve hours is ordinarily adequate and the time of reaction again is inversely proportional to the temperature. All of the products of this degradative process have less than 80%—and preferably less than about 65%—of the theoretically maximum amount of oxirane oxygen. But because one of the advantages of the products of this invention is that they stabilize, as well as plasticize, halogen-containing plastics such as vinyl resins and chlorinated rubber by virtue of containing epoxy groups, it is important that the process of the degradative acylation be stopped before all of the epoxy groups are converted to vicinal acyloxy groups. It has been found that about 15%–20% of the theoretically maximum amount of oxirane oxygen should be retained. Thus, the products of the degradative process contain from about one—but preferably from two—to 20 pairs of vicinal acyloxy groups for every four epoxy groups. The product is finally stripped of volatile materials by distillation under reduced pressure.

The instant process is one of improving the plasticizing properties of epoxidized esters. The improvement results in better and more permanent compatibility with plastics, definitely less migration of the ester to the surface of plastic compositions in which the products are incorporated, and greater freedom from extraction—particularly by soapy water. Plastic compositions containing the products herein claimed are the subject matter of our application Serial No. 507,142, filed May 9, 1955, now abandoned.

This process of post-acylation has been applied to a wide variety of epoxidized esters and in every instance the post-acylated products of this invention had real advantages over the epoxidized esters from which they were made, while at the same time retaining their ability to prevent the decomposition of halogen-containing plastics under the influence of time, light and heat.

By the term "epoxidized esters," as used herein, is meant that group of recognized materials which are made by the epoxidation of olefinically unsaturated esters and which contain epoxy substituents and hydroxy substituents as a result of having been epoxidized.

Methods of epoxidizing olefinically unsaturated esters are well known and are described in U.S. Patents 2,458,484, 2,485,160, 2,567,930, and 2,569,502 and in journal articles including one by Greenspan and Gall (Industrial & Engineering Chemistry, vol. 45, No. 12, pp. 2722–2726 (December 1953)). Current commercial methods of epoxidation employ performic acid or peracetic acid as the epoxidizing agents. As noted above, when performic acid is used, the substituents on the resultant esters are hydroxyl and formoxy groups as well as epoxy groups. When peracetic acid is used, hydroxyl and acetoxy substituents as well as the epoxy groups are added to the esters. When the epoxidized esters are washed—as is ordinarily the case—in order to remove the epoxidizing reactants some of the acyloxy groups are hydrolyzed to hydroxyl groups. This is particularly true of formoxy groups. Consequently, the epoxidized esters invariably contain hydroxyl groups and it is these groups which are post-acylated by the instant process.

The process of this invention applies to the epoxidized esters which are the products obtained by the epoxidation of the following kinds of water-insoluble, olefinically unsaturated esters:

(1) Esters of (a) saturated monohydric and polyhydric alcohols typified by ethyl, isopropyl, tert-butyl, n-hexyl, 2-ethylbutyl, n-octyl, 2-ethylhexyl, lauryl, octadecyl, cyclohexyl, benzyl alcohols; ethylene glycol, diethylene glycol, 1,2-propylene glycol, 2-ethylhexandiol-1,3, butandiol-1,3, butandiol-1,4, dodecandiol-1,12, glycerol, pentaerythritol, and the isomers and homologues of the above, and (b) mono-olefinically and poly-olefinically unsaturated acids typified by undecylenic, myristolenic, oleic, linoleic, linolenic, palmitolenic, petroselic and erucic acids. This class includes the naturally occurring oils typified by soybean, corn, cottonseed, safflower, sunflower, sesame, poppyseed, walnut, peanut, linseed and perrilla oils.

(2) Esters of (a) mono-olefinically and poly-olefinically unsaturated alcohols typified by oleyl, linoleyl and linolenyl alcohols and the oil-alcohols which are commercially available and which are made by sodium-alcohol reduction of esters of naturally occurring fatty acids such as the fatty acids of soybean and linseed oils, and (b) saturated acids such as acetic, butyric and hexoic acids and their isomers and homologues.

(3) Esters of (a) unsaturated alcohols typified by those listed under 2(a) above, and (b) unsaturated acids typified by those listed under 1(b) above. These are typified by oleyl undecylenate, linolenyl oleate, the mixture of esters of oil fatty acids and oil alcohols.

The products of this invention are mixtures of esters of higher fatty acids having as substituents about two to about eight percent by weight epoxy groups and about one to about thirty-five percent by weight pairs of vicinal acyloxy groups.

The following examples illustrate the process of this invention wherein free hydroxyl groups present in an epoxidized ester are converted, together with some epoxy groups, into pairs of vicinal acyloxy groups.

*Example I*

Into a reactor equipped with thermometer, agitator, fractionating column and condenser was charged 400 grams of 2-ethylhexyl epoxystearate. This was the product obtained by epoxidizing 2-ethylhexyl oleate by means of hydrogen peroxide, formic acid and a small amount of phosphoric acid. The epoxidized ester had an oxirane oxygen-content of 3.66%, an iodine number of 2.7, a saponification number of 151 and an acid number of 2.7. To the ester was added 103 grams of acetic anhydride and the mixture was heated to boiling. Heating was continued for four hours during which time acetic acid was removed by distillation. It was then stripped of acetic anhydride up to 100° C./2 mm. The product had an oxirane oxygen-content of 3.56%, an iodine number of 2.5, a saponification number of 167 and an acid number of 2.7. There was 1.15% by weight pairs of acetoxy groups in said product.

The final product and the epoxidized ester from which it was made were each incorporated and tested and compared as plasticizers in polyvinyl chloride compositions having the following formulation in which the parts are by weight:

|  | Parts |
|---|---|
| Polyvinyl chloride (Geon 101) | 60 |
| Plasticizer | 40 |
| Basic lead sulfate (Tribase) | 1 |
| Stearic acid | 0.5 |

The individual compositions were blended and then milled at about 160° C. for 5 minutes and were sheeted off the roller mill at the same thickness of 10 mils. The films thus obtained were very similar as to appearance and physical characteristics but the film containing the post-acetylated ester was much more resistant to soapy water extraction than the film containing the original epoxidized ester. The test consisted of immersing weighed specimens of the sheets for 24 hours in a 1% solution of Ivory soap maintained at 60° C. and determining the loss in weight due to extraction of the plasticizer by the soapy water.

*Example II*

The process of Example I was followed in the post-acetylation of epoxystearyl 2-ethylhexanoate. The original epoxidized ester had an oxirane oxygen-content of 3.2%, an iodine number of 2.8 and a saponification number of 138 whereas the post-acetylated product of this invention had an oxirane oxygen-content of 3.1%, an iodine number of 2.6 and a saponification number of 156. There were 3.9% by weight pairs of acetoxy groups in the post-acetylated product. Polyvinyl compositions were prepared and tested as in Example I and those containing the product of this example were at least 25% more resistant to soapy water extraction than were polyvinyl compositions containing the original epoxidized ester, from which the post-acylated product of this example was prepared.

*Example III*

A mixture of 130 parts of epoxidized soybean oil, prepared by the process of U.S. Patent No. 2,485,160, and 26 parts of acetic anhydride was stirred and heated to 130° C. in 40 minutes and held at 130°–145° C. for 1.5 hours while acetic acid was continuously separated by distillation. The product was then stripped of acetic anhydride up to 110° C./4 mm. The product had an oxirane oxygen-content of 5.54% as against 6.03% for the original ester. Said product contained 10.7% by weight pairs of acetoxy groups. A polyvinyl composition like that described above and containing the post-acetylated ester was unaffected in the soapy water extraction test described above whereas a corresponding polyvinyl composition containing the original epoxidized ester lost almost 2% of its weight in the same test.

*Example IV*

A stirred mixture of 1000 grams of epoxidized soybean oil, prepared by the process of U.S. Patent No. 2,485,160 and having an oxirane oxygen-content of 6.2%, and 200 grams of acetic anhydride was heated to 144° C. in 65 minutes and held at 144°–150° C. for 1.5 hours. The reaction mixture was then stripped of volatile materials at 50°–125° C./1 mm. Hg. The product had an oxirane oxygen-content of 5.13% and contained 12.6% by weight pairs of acetoxy groups. This acetylated ester was compared with the original oil from which it had been made, and with a commercial polyester plasticizer known to have been made from sebacic acid and propylene glycol, and with dioctyl phthalate which is a widely used plasticizer. The comparison was made by incorporating the materials in polyvinyl compositions similar to the one above and then measuring the resistance of the plasticizers to extraction from the vinyl resin compositions by hot soapy water. Slightly different amounts of the materials were used in conjunction with the polyvinyl chloride in an effort to produce films having approximately the same modulus of elasticity. Consequently, 35% of dioctyl phthalate (based on the total weight of the resin and the dioctyl phthalate) was used. The product of this example was used in an amount equal to 40% while the original epoxidized oil from which the product of this example was made and the polyester plasticizer were compounded in amounts equal to 39% and 41%, respectively, on the same basis. The films of the polyvinyl compositions, 10 mils in thickness, were subjected to a severe test by immersion in a 5% Ivory soap solution at 90° C. for 67 hours. Under these conditions, the loss in weight by extraction of the film containing the dioctyl phthalate was 26.5% of the original weight of the film, the loss from the polyester film was 23.4%, the loss from the film containing the original epoxidized soybean oil was 8.7% while the loss from the film containing the post-acetylated product of this invention was only 1.2%.

This example was repeated many times with only slight changes in the ratio of acetic anhydride to epoxidized oil or in the time and temperature of reaction. In every instance, the post-acetylated oil had a marked advantage over the original epoxidized ester when incorporated in polyvinyl chloride compositions.

The same improvement was effected when the esters of the above examples were acylated with ketenes or the anhydrides of propionic and butyric acids. Furthermore, the same improvement was made in epoxidized cottonseed, linseed and safflower oils by acylation according to the process of Example III.

The above examples are drawn to mild acylation of epoxidized esters wherein the oxirane oxygen-content is reduced by only a small amount. The following examples serve to illustrate the phase of this invention wherein the epoxidized esters are degradatively acylated and many of the epoxide groups in the ester are opened and thereby converted to pairs of vicinal acyloxy groups. The products which are thus prepared have higher viscosity than the epoxidized esters from which they are made. Also the degradatively acylated oils behave like the polyester plasticizers of high molecular weight which are held in such high regard as non-migrating plasticizers for vinyl plastics. In addition, however, the products of this invention have far better resistance to extraction by soapy water and of course they impart much better heat-stability and light-stability to halogen-containing resins and plastics, presumably because they contain epoxy groups.

*Example V*

Two hundred grams of epoxidized soybean oil, made by the process of U.S. Patent No. 2,485,160 and containing 5.97% oxirane oxygen, was stirred and heated with 300 grams of acetic anhydride and 3 grams of sodium acetate to refluxing temperature (circa 135° C.); and the mixture was refluxed for 3 hours. Then volatile components were removed by distillation up to 125° C. and 1 mm. Hg. The product had an oxirane oxygen-content of 3.0%, an iodine number of 2, and contained 22.6% by weight pairs of acetoxy groups. It was compatible with polyvinyl chloride, exerted a marked softening effect, had far greater resistance to soapy water extraction than the ester from which it was made. It also resembled commercial polyester plasticizers in its freedom from spewing with time or at elevated temperatures. At the same time, it stabilized the polyvinyl chloride against degradation and darkening to a far greater extent than a commercial polyester plasticizer.

*Example VI*

Epoxidized linseed oil was degradatively acetylated by the process of Example V. Thus 600 grams of epoxidized linseed oil having an oxirane oxygen-content of 7.86% was stirred with 600 grams of acetic anhydride and 3 grams of sodium acetate for three hours at the refluxing temperature (circa 135° C.). Volatile materials were stripped off at 50°–125° C./10 mm. Hg. The product had an oxirane oxygen-content of 3.3% and contained 31.4% by weight pairs of acetoxy groups; and it had the same advantages over the original oil and polyesters as did the product of Example V.

*Example VII*

To a 500-ml. flask reactor fitted with a stirrer and reflux condenser was charged 2-ethylbutyl epoxystearate, 210.5 grams, 0.5 mole based on the analysis for oxirane oxygen. The epoxidized ester was prepared by treatment of 2-ethylbutyl oleate with hydrogen peroxide, formic acid, and a small amount of phosphoric acid, and the original epoxidized ester had the following constants: oxirane oxygen content, 3.65%; saponification number, 137. To the ester was added 153.1 grams, 1.5 moles, of acetic anhydride, and this mixture was heated to boiling. Heating was continued for about three hours, at the end of which time a small sample was withdrawn for analysis; its oxirane oxygen content was 3.2% and its saponification number was 176. Heating was continued for about 3½ more hours, and the reaction mixture was then cooled, washed with water and stripped of volatiles to 100° C./20 mm. The final product had the following constants: oxirane oxygen content, 2.3%; saponification number, 201. The percent by weight pairs of vicinal acetoxy groups in said product was 11.5.

It was compatible with polyvinyl chloride, exerted a marked softening effect, had far greater resistance to soapy water extraction than the ester from which it was made. It also resembled commercial polyester plasticizers in its freedom from spewing with time or at elevated temperatures. At the same time, it stabilized the polyvinyl chloride against degradation and darkening to a far greater extent than a commercial polyester plasticizer.

From the above, it is evident that, within the purview of this invention, there are produced new compositions of matter comprising a vinyl halide polymer plasticized with epoxidized esters of higher fatty acids having as sole substituents oxirane oxygen and vinicnal acyloxy groups, said epoxidized esters being separately claimed in our copending application Serial No. 729,076, now abandoned. Within the meaning of the term vinyl halide polymer, as used herein, there is included vinyl chloride and copolymers of vinyl chloride with vinyl esters, such as vinyl acetate, polyvinylidene chloride, polyvinyl butyral, and the like.

We claim:

1. As a new composition of matter, a vinyl halide polymer containing as a plasticizer therefor a mixture of water-insoluble alkyl esters of aliphatic acids containing 11 to 22 carbon atoms and alcohols from the group consisting of monohydric and polyhydric alcohols containing from two to eighteen carbon atoms, the esters in said mixture being substantially free of ethylenic unsaturation, each ester in said mixture having as sole substituents on different pairs of carbon atoms at least one substituent from the group consisting of oxirane oxygen and pairs of vicinal acyloxy groups containing two or four carbon atoms, the total substituents in the esters of said mixture averaging about two to about eight weight percent oxirane oxygen and about one to about thirty-five weight percent pairs of said vicinal acyloxy groups.

2. As a new composition of matter, polyvinyl chloride containing as a plasticizer therefor a mixture of water-insoluble, alkyl esters of aliphatic acids containing 11 to 22 carbon atoms and alcohols from the group consisting of monohydric and polyhydric alcohols containing from two to eighteen carbon atoms, the esters in said mixture being substantially free of ethylenic unsaturation, each ester in said mixture having as sole substituents on different pairs of carbon atoms at least one substituent from the group consisting of oxirane oxygen and pairs of vicnal acyloxy groups containing two to four carbon atoms, the total substituents in the esters of said mixture averaging about two to about eight weight percent oxirane oxygen and about one to about thirty-five weight percent pairs of said vicinal acyloxy groups.

3. As a new composition of matter, a copolymer of vinyl chloride and vinyl acetate containing as a plasticizer therefor a mixture of water-insoluble, alkyl esters of aliphatic acids containing 11 to 22 carbon atoms and alcohols from the group consisting of monohydric and polyhydric alcohols containing from two to eighteen carbon atoms, the esters in said mixture being substantialy free of ethylenic unsaturation, each ester in said mixture having as sole substituents on different pairs af carbon atoms at least one substituent from the group consisting of oxirane oxygen and pairs of vicinal acyloxy groups containing two to four carbon atoms, the total substituents in the esters of said mixture averaging about two to about eight weight percent oxirane oxygen and about one to about thirty-five weight percent pairs of said vicinal acyloxy groups.

4. As a new composition of matter, polyvinyl chloride containing as a plasticizer therefor a soybean oil which is substantially completely saturated and which contains as sole substituents on different pairs of carbon atoms about two to about eight percent by weight oxirane oxygen and about one to about thirty-five percent by weight pairs of vicinal acyloxy groups from the class consisting of acetoxy, propionoxy, and butyroxy groups.

References Cited in the file of this patent

UNITED STATES PATENTS

| | | |
|---|---|---|
| 2,692,892 | Hillyer et al. | Oct. 26, 1954 |
| 2,728,781 | Shokal et al. | Dec. 27, 1955 |
| 2,745,846 | Dazzi | May 15, 1956 |
| 2,842,513 | Fitzgerald et al. | July 8, 1958 |
| 2,895,966 | Ault et al. | July 21, 1959 |
| 2,898,348 | Swern et al. | Aug. 4, 1959 |